United States Patent
Plasson et al.

(10) Patent No.: US 6,795,688 B1
(45) Date of Patent: Sep. 21, 2004

(54) METHOD AND SYSTEM FOR PERSONAL AREA NETWORK (PAN) DEGREES OF MOBILITY-BASED CONFIGURATION

(75) Inventors: Ned D. Plasson, Park City, UT (US); Vinay S. Badami, San Jose, CA (US); Jonathan Wood, American Fork, UT (US); Ronald D. Smith, American Fork, UT (US); Peter Rigstad, Holladay, UT (US)

(73) Assignee: 3Com Corporation, Santa Clara, CA (US)

( * ) Notice: Subject to any disclaimer, the term of this patent is extended or adjusted under 35 U.S.C. 154(b) by 603 days.

(21) Appl. No.: 09/765,905

(22) Filed: Jan. 19, 2001

(51) Int. Cl.[7] .............................................. H04B 7/00
(52) U.S. Cl. ..................................... 455/41.2; 455/41.1
(58) Field of Search ............................. 455/404.2, 410, 455/411, 426.2, 440, 441, 555, 554, 90.2, 95, 553, 80, 66.1, 453, 41.1, 41.2, 41.3, 418, 346, 345, 577, 558, 127.1, 140, 164, 420, 421, 424, 517, 425

(56) References Cited

U.S. PATENT DOCUMENTS

| | | | | |
|---|---|---|---|---|
| 6,104,913 A | * | 8/2000 | McAllister | 455/41 |
| 6,314,091 B1 | * | 11/2001 | LaRowe, Jr. et al. | 370/338 |
| 2002/0022453 A1 | * | 2/2002 | Balog et al. | 455/41 |
| 2002/0068604 A1 | * | 6/2002 | Prabhakar et al. | 455/556 |

* cited by examiner

Primary Examiner—Nay Maung
Assistant Examiner—Angelica M. Perez

(57) ABSTRACT

A method and system thereof for dynamically configuring a device, adapted to be communicatively coupled in a wireless personal area network, with an attribute corresponding to a characteristic of the device. In one embodiment, the method involves receiving an attribute setting corresponding to characteristics of the device and implementing a corresponding configuration state. In this embodiment, the configuration state activates a corresponding device configuration. In one embodiment, the attribute setting constitutes a discretely variable value conforming to the degree of mobility of the device. In one embodiment, an attribute setting constitutes a discretely variable value conforming to the location of the device. In one embodiment, two attribute settings constitute discretely variable values conforming, one to the degree of mobility of the device, and the other to its location. In one embodiment, the device and network incorporate communicative capability compliant with the Bluetooth specification.

27 Claims, 8 Drawing Sheets

METHOD AND SYSTEM FOR PERSONAL AREA NETWORK (PAN) DEGREES OF MOBILITY-BASED CONFIGURATION

BACKGROUND OF THE INVENTION

1. Field of the Invention

The present invention relates to the field of wireless communications networks. Specifically, the present invention relates to a method and system for configuring a personal area network (PAN) based on the degree of mobility of the elements of the network.

2. Background Art

Personal Area Networks (PANs) are proliferating rapidly and widely with the advancement of network technologies and the growth of network-utilizing, and even network-dependent applications. In general, a personal area network is a network comprised of devices ("member devices") that are personal to a particular user, such as the user's personal digital assistant (PDA), laptop computer system, and cell phone. Other devices may be members of a PAN under certain circumstances, such as desktop computers, other computers and information processing and storage systems, document centers, other telephone and communication systems, and portals and other interface devices. Such other devices may or may not be specifically personal to that user on all occasions, but under the circumstances, they may be a part of that user's PAN.

The personal area network can also include services supporting the interaction, collaboration and cooperation among the member devices. The member devices are communicatively coupled in the personal area network using a wireless technology such as Bluetooth, infrared, wireless Local Area Network (wireless LAN), etc., or combinations of these technologies. However, a personal area network can also include other devices, as well as local area network (LAN) devices and wide area network (WAN) devices that communicate by way of WAN/LAN-to-PAN bridges or proxies.

Typically, some member devices in a particular personal area network may travel together with the user, as from the business office to the home and/or home office, through airports and other public places, and to points in between. Other member devices may "reside" at a particular location, such as the home or office, yet are possibly present in different rooms therein. Others still may be fixed at a specific location therein. Yet others may occasionally travel with the user, and occasionally "reside" at a particular location.

The various member devices constituting a PAN have their own characteristics. These characteristics are unique to each device. One such characteristic is degree of mobility. Given the portability and mobility of certain of the member devices, such as cell phones, laptop computers, and PDAs, they are more likely to be mobile than certain other of the member devices, such as desktop computers and document centers. However, it is appreciated that even the more stationary devices may move from time to time. For example, a desktop computer may be transferred to another office, or a document center may be wheeled to another room or a different floor. Certain member devices, such as fixedly mounted Bluetooth to LAN portals, are completely static. Such static devices seldom, if ever, move; they are used as static member devices.

Another such characteristic is location. Some of the member devices are more likely to be at certain locations and less likely to be at other locations than certain of the other member devices. Mobile member devices will most likely be present and used in a wider variety of locations than more stationary member devices. For example, the locations of cell phones, laptop computers, and PDAs may change almost constantly. Further, such mobile member devices may be used in any of these locations, and/or in-transit. Desktop computers, document centers, facsimile systems, and other such less mobile member devices, may be used only in a certain office, or on a certain floor in a certain building. However, they may, perhaps occasionally be moved from office to office, or to a different floor in the building, etc. Static member devices have fixed locations, which seldom, if ever change. Another such characteristic is degree of utilization of a member device while mobile. It is appreciated that other such characteristics may be described.

Further, the characteristics for certain of the devices may change. For certain of the member devices, change in characteristics, such as change in degree of mobility and change in location may be more or less frequent, and the member devices may be used differently as their degree of mobility changes. For example, a cell phone or a PDA may have a high degree of mobility, frequently taken for use while the user is actually traveling. However, when the user reaches a destination, such as an office, the cell phone and PDA degree of mobility changes; it is reduced, for at least as long as the user remains in the office. Perhaps in the office, the cell phone is turned off as a line telephone there is used, and the PDA is placed in a docking cradle and synchronism with the desktop computer. In another example, a laptop computer may be used equally in the office, in the home, and while mobile, and it may be mobile a significant portion of the time it is in use. However, when it is used in the office or at home, it has a different degree of mobility than when it is used while traveling. For the time it is in the office, a laptop computer may be used much like a desktop computer; normally a device less mobile than the laptop. Further, travel may be sporadic, with periods of time where the laptop does not often leave the office. Thus, it is apparent that one characteristic, such as degree of mobility, may be related to other characteristic, such as location.

Device characteristics are significant because certain configuration parameters, including operational protocols and operating enablements, and restrictions may be associated with them. One such associated configuration parameter is polling. Member devices in a personal area network poll to determine their location vis-à-vis the personal area network, and other devices with which they can communicate. Depending on their relative degrees of mobility, the frequency of such polling by member devices may be correspondingly more or less frequent. For example, member devices with high degrees of mobility, such as a particular cell phone or PDA, may poll quite frequently. Other member devices, perhaps a desktop computer and a document center, move much less frequently, and correspondingly have relatively low degrees of mobility. Hence, they poll commensurably less frequently than the high degree of mobility member devices do.

Another member device, a laptop computer for instance, may have as high a degree of mobility as the aforementioned PDA and cell phone. However, perhaps under certain circumstances, the laptop computer has not quite as high a degree of mobility, as when it is used in an office in the same way that a desktop computer is used. In the first situation, where the laptop computer has a high degree of mobility, it polls quite frequently, as do other devices with commensurate degrees of mobility. In the second circumstance, the laptop computer, used in the same way as a desktop computer, has a lower degree of mobility, commensurate with that of a desktop computer. In that circumstance, the laptop computer polls commensurably less frequently.

In the case of fixed position member devices, such as a Bluetooth to LAN portal fixedly mounted on a structural surface such as a ceiling, the member device is static; its corresponding degree of mobility is effectively zero. In as much as this device "knows where it is at all times," its polling rate can be exceedingly infrequent; perhaps it does not poll at all.

Another such associated configuration parameter is security. Configuring security settings based on the propensity of a member device to move about, and/or to find itself in a location of unknown or greater risk is desirable to reduce threats to the security of data, and the integrity of the network. Such threats include unauthorized contact by "outside," i.e., non-member communicative devices. Such unauthorized contact may compromise sensitive data stored within the member device, or expose the personal area network, via the member device, to such compromise, or to infection. Thus, it is important to configure security settings to promote the safety and integrity of the personal area network as well as the data and information stored therein or transferred thereon.

Another associated configuration parameter is that of services. Many mobile devices, including member devices of a personal area network are powered, especially while mobile, by batteries. Battery power is significantly finite and must be routinely refreshed by recharging to enable mobile devices to operate. The member devices of a personal area network may thus face power constraints while away from their battery chargers, as they often are while mobile. Power dependent services include sending and receiving data, inquiries, authentication, and establishing network connections. Power saving modes of operation are desirable for such services, when the member devices are operating on battery power, away from the location of their battery chargers.

For example, member devices in a Bluetooth-enabled personal area network, prior to establishing communicative coupling, are in a STANDBY mode, wherein they "listen" for messages at intervals of 1.28 seconds. Connection is initiated by any of the member devices, which then becomes the "Master" unit. The Master transmits a PAGE message, if the address sought is known, or an INQUIRY message followed by a subsequent PAGE message, if the address sought is unknown. The INQUIRY message is typically used for "finding" other Bluetooth-enabled devices. Responding devices become "Slave" units. Once contact is established, power saving services can be applied.

The Master device can put the Slaves into a HOLD mode, where only an internal timer is running. Slaves can also demand to be placed into a HOLD mode. When units transition out of HOLD mode, data transfer restarts instantly. Another power saving service is SNIFF mode, in which Slaves devices "listen" to the network, but at a reduced rate, thereby reducing their duty cycle. SNIFF mode is programmable, and application-dependent. Yet another power-saving service is PARK mode, in which a device remains synchronized to the network, but does not participate in the network communications traffic. In the order of increasing power efficiency, SNIFF mode has the highest duty cycle, then HOLD mode, whose duty cycle is lower, and finally PARK mode, which has the lowest duty cycle.

Member devices with high degrees of mobility can be expected to be running on battery power, away from their battery chargers significantly more often than other member devices with commensurably lower degrees of mobility. For member devices with high degrees of mobility, in locations away from their battery chargers and not in present, active communication with the network, it may be desirable to operate in a configuration of greater power efficiency and corresponding lower duty cycle. For member devices of lower degrees of mobility, and/or located proximate to their battery chargers or running on line power or other power source, power efficiency may not be as crucial, such that power efficient configuration may be less advantageous.

Another configuration parameter is allowable, or enabled applications for a given characteristic of a member device. For example, if a member device is a portable printer, it is likely that it will be used to actually print when it is deployed in a certain location, and/or with a lower degree of mobility, such as the home, the office, and other fixed, and perhaps semi-fixed sites, such as client sites including visited locales and temporary office structures. It is less likely that it will be used to actually print when in transit, with a higher degree of mobility, as in a vehicle, a train, or a plane. When the member printer is deployed in a semi-fixed locale, it may be configured to print. However, when in transit, it may more commonly be configured in some non-printing standby mode. It should be appreciated that the present case illustrates overlapping configuration parameters, as the more common in-transit non-printing standby state is conceivably a more power-efficient state, and possibly more secure. It should be appreciated that other configuration parameters contingent on network device characteristics, beside those discussed above, exist and may yet be developed.

To maintain appropriate configuration parameters, such as to maximize power efficiency, and to maintain both the security of sensitive information and the operability of the personal area network, member devices should be configured in accordance with their specific characteristics. For instance, in the area of security, member devices in the personal area network should be able to communicate with each other, but communication with other devices outside the network should be controlled. In some instances, communication between the personal area network and non-member devices in the vicinity is desirable, while in other instances it is not. For example, when in a trusted location such as the business office, and with a relatively low degree of mobility set therein, the user may only encounter "known" or "friendly" devices, and thus a low security level may be used to facilitate communication between the personal area network and non-member devices. When traveling between the office and home, with a relatively high degree of mobility, and in public places, the user may encounter unknown devices, and so will want to use a higher level of security. Upon reaching home, the user may want to return to the lower security level, or to some other security level that is appropriate.

To implement the proper operating configuration, a user changes settings on each of the member devices in order to appropriately configure each device to conform with its unique characteristics. Generally, a user-friendly interface is provided for each device so that the user can change the settings as needed.

However, a problem with the prior art is that the user separately changes the settings on each of the devices in his/her personal area network. First, the user must retrieve each member device (e.g., from a briefcase, etc.). Because the devices may likely be in some type of power-saving mode, the user will also have to activate the devices and wait for them to power up. Then, for each device, the user must execute the application that changes the configuration. This may require scrolling through a number of windows or menus in order to find and set the required options. Thus, in order to configure the devices in the personal area network, the user is inconvenienced in several different ways.

In addition, the application for changing the configuration is likely to be different for each device. Thus, the user needs to remember the intricacies involved with changing the configurations on each device in the personal area network. Further, under these circumstances, errors may be likely to occur.

Furthermore, as personal area networks and member devices proliferate, the inconvenience to the user will be exacerbated because situations where the configuration needs to be changed from one mode to another will be more frequently encountered.

Another conceivable prior art solution is revamping existing network architecture and the wireless netscape to account for individual member device characteristics. However, this would appear to be exceedingly expensive and inefficient.

Accordingly, what is needed is a method and/or system that efficiently accommodates member devices having varied respective characteristics. Another need exists for a method and system which meets the above need and which can accommodate changes in the varied characteristics of member devices. Still another need exists for a method and system which meets the above needs and which is applicable without revamping of existing network infrastructures.

DISCLOSURE OF THE INVENTION

The present invention provides a method and system thereof that can efficiently accommodate member devices having varied respective characteristics. The present invention also provides a method and system which achieves the above accomplishment and which can accommodate changes in the varied characteristics of member devices. Further, the present invention provides a method and system which achieves the above accomplishment and which is applicable without revamping of existing network infrastructures.

In the present embodiment, the present invention pertains to a method and system for dynamically configuring a device, adapted to be communicatively coupled in a wireless personal area network, with an attribute corresponding to a characteristic of the device. An attribute setting corresponding to this characteristic is received.

In one embodiment, the attribute setting constitutes a discretely variable value conforming to the degree of mobility of the device and/or network. In another embodiment, the attribute setting constitutes a discretely variable value conforming to the nature of the location of the network and/or device. In another embodiment, the attribute setting constitutes a discretely variable value derived by combining correspondence to the degree of mobility of the network and/or device and conformance to the nature of its location. In yet another embodiment, multiple attribute settings may exist, one constituted by a discretely variable value corresponding to the degree of mobility, and another constituted by a discretely variable value conforming to the nature of the location, characterizing the network and/or device. Such discretely variable values may range from a discrete high value to a discrete low value. Upon receiving this attribute setting, a configuration state is implemented correspondingly, in one embodiment.

In one embodiment, a configuration state so implemented activates a corresponding device configuration. This configuration may selectively enable and restrict modes of operation of the device in one implementation. In one embodiment, these modes of operation may define settings used by applications executing on the device. Such applications may include, but are not limited by the present invention to, security settings; polling, interconnection, and control protocols; communicative response and other communicative capabilities; power level definition; power state permissiveness; and various other protocols. In one embodiment of the present invention, the personal area network and member devices may incorporate communicative capability compliant with the Bluetooth specification. However, it should be appreciated that the present invention is not limited to Bluetooth applications, but is applicable to any wireless, infrared, or other communicative technology.

These and other objects and advantages of the present invention will become obvious to those of ordinary skill in the art after reading the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
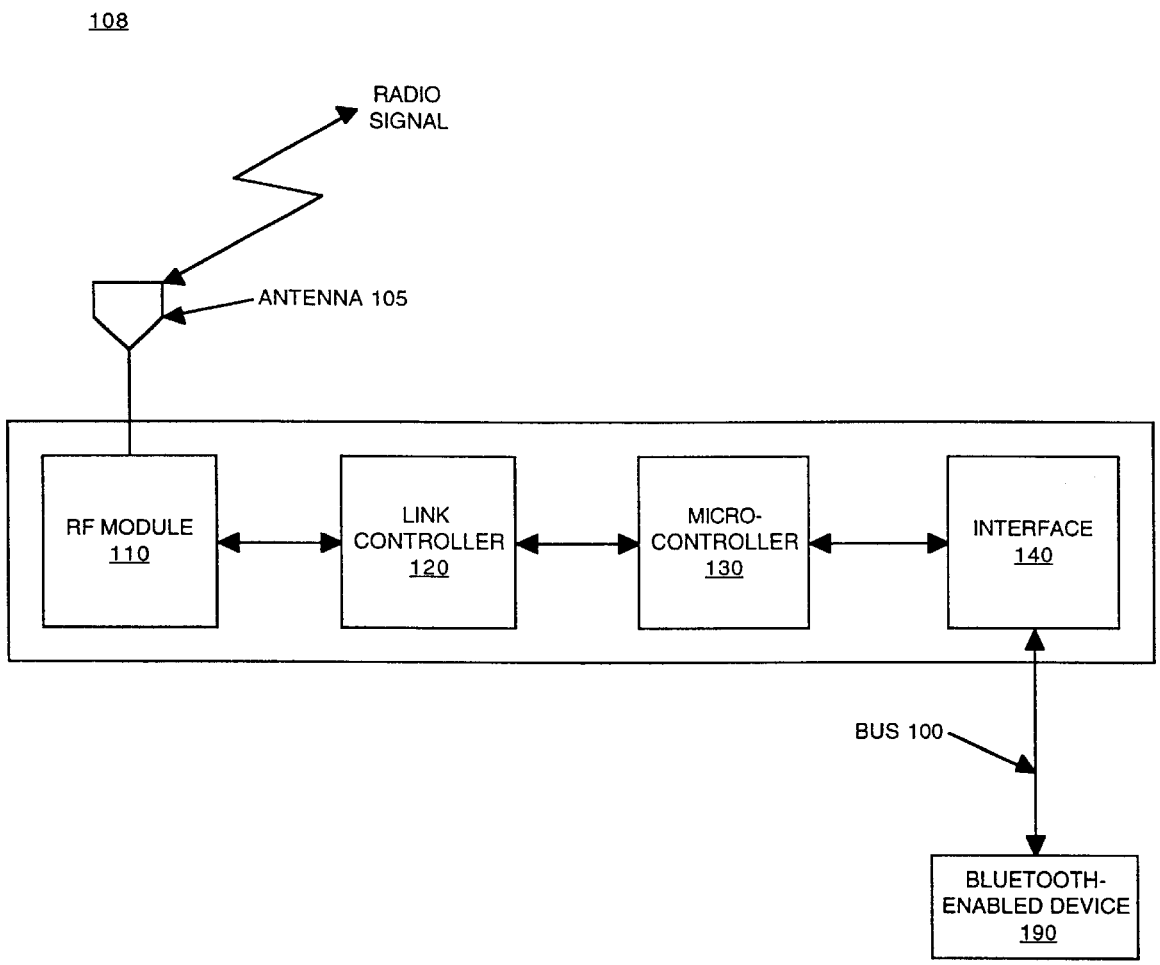
FIG. 1 is a block diagram showing one embodiment of a wireless transceiver in accordance with the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "sending," "receiving," "using," "selecting," "configuring," "polling," "communicating," "placing," "sensing," "paging," "inquiring," "sniffing," "parking," "holding," "identifying," "accessing," "locating," "updating," "setting," "detecting," or the like, refer to the action and processes (e.g., processes 500 and 600 of FIGS. 5 and 6, respectively) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

The present invention is discussed primarily in a context in which devices and systems are coupled using wireless links, and specifically with regard to devices and systems compliant with the Bluetooth technology. Bluetooth is the code name for a technology specification for small form factor, low-cost, short-range radio links between personal computers (PCs), mobile phones and other devices. The Bluetooth technology allows cables that connect one device to another to be replaced with short-range radio links. However, it is appreciated that the present invention may be utilized with devices, networks, and systems coupled using technologies different from the Bluetooth technology, wireless or otherwise. It is applicable to devices, systems, and networks communicatively coupled using infrared, radio, other electromagnetic, telephonic, and any other communicative technology.

In the parlance of Bluetooth, a collection of devices connected in a Bluetooth system is referred to as a "piconet" or a "subnet." A piconet starts with two connected devices, such as a computer system and a cellular phone, and may grow to eight connected devices. All Bluetooth devices are peer units; however, when establishing a piconet, one unit will act as a master and the other(s) as slave(s) for the duration of the piconet connection. A "personal area network" is, in essence, a form of a piconet comprised of user-personal devices (such as a cell phone, PDA, etc.) and the services that support interaction, collaboration and cooperation among those devices.

A Bluetooth system supports both point-to-point and point-to-multi-point connections. Several piconets can be established and linked together in a "scatternet," where each piconet is identified by a different frequency hopping sequence. All devices participating on the same piconet are synchronized to their respective hopping sequence.

A connection between Bluetooth devices is made by a "page" message if the address is already known, or by an "inquiry" message followed by a page message if the address is unknown. The inquiry message enables the Bluetooth device to discover which other Bluetooth units are in range and what their addresses are, as well as other information such as their clocks and class-of-device. A "discoverable device" is a Bluetooth device in range that will respond to an inquiry (normally in addition to responding to a page). A "connectable device" is a Bluetooth device in range that will respond to a page.

FIG. 1 is a block diagram of one embodiment of a transceiver 108 in accordance with the present invention. In a preferred embodiment (the "Bluetooth embodiment"), transceiver 108 is a Bluetooth device comprising a digital component (e.g., a Bluetooth controller) and an analog component (e.g., a Bluetooth radio).

In the present embodiment, transceiver 108 comprises an antenna 105 for receiving or transmitting radio signals, a radio frequency (RF) module 110, a link controller 120, a microcontroller (or central processing unit) 130, and an external interface 140. In the present embodiment, transceiver 108 is coupled by a system bus 100 to a Bluetooth-enabled device 190 (e.g., a host device such as a computer system or similar intelligent electronic device, a PDA, a printer, a fax machine, etc.). However, it is appreciated that in another embodiment, transceiver 108 may be integrated into Bluetooth-enabled device 190.

In the Bluetooth embodiment, RF module 110 is a Bluetooth radio. The Bluetooth radio can provide: a bridge to existing data networks, a peripheral interface, and a mechanism to form piconets or personal area networks of connected devices away from fixed network infrastructures.

Bluetooth radios operate in the ISM (Industrial, Scientific, Medical) band at 2.4 GHz. A frequency hop transceiver is applied to combat interference and fading. Bluetooth uses a packet-switching protocol based on a frequency hop scheme with 1600 hops/second. Slots can be reserved for synchronous packets. A packet nominally covers a single slot, but can be extended to cover up to five slots. Each packet is transmitted in a different hop frequency. The entire available frequency spectrum is used with 79 hops of one (1) MHz bandwidth, defined analogous to the IEEE (Institute of Electronic and Electrical Engineering) 802.11 standard. The frequency hopping scheme is combined with fast ARQ (Automatic Repeat Request), cyclic redundancy check (CRC) and Forward Error Correction (FEC) for data.

In one embodiment, link controller 120 is a hardware digital signal processor for performing baseband processing as well as other functions such as Quality-of-Service, asynchronous transfers, synchronous transfers, audio coding, and encryption. Link controller 120 has two major states: standby and connection. In addition, there are seven sub-states: page, page scan, inquiry, inquiry scan, master response, slave response, and inquiry response. The sub-states are interim states that are used to add new slaves to a piconet.

Continuing with reference to FIG. 1, in one embodiment, microcontroller 130 is an application specific integrated circuit (ASIC). In the Bluetooth embodiment, microcontroller 130 is a separate central processing unit (CPU) core for managing transceiver 108 and for handling some inquiries and requests without having to involve the host device. In the Bluetooth embodiment, microcontroller 130 runs software that discovers and communicates with other Bluetooth devices via the Link Manager Protocol (LMP). The LMP provides a number of services including sending and receiving of data, inquiring of and reporting a name or device identifier, making and responding to link address inquiries, connection setup, authentication, and link mode negotiation and setup.

In one embodiment, interface 140 is for coupling transceiver 108 to Bluetooth-enabled device 190 in a suitable format. Transceiver 108 may be coupled by system bus 100 to Bluetooth-enabled device 190 (e.g., a host device such as a computer system or similar intelligent electronic device, a PDA, a printer, a fax machine, etc.), or transceiver 108 may be integrated into Bluetooth-enabled device 190. In one embodiment, interface 140 runs software that allows transceiver 108 to interface with the operating system of Bluetooth-enabled device 190. In accordance with the present invention, interface 140 may be any of a variety of physical bus interfaces, including but not limited to a Universal Serial Bus (USB) interface, a Personal Computer (PC) Card interface, a CardBus or Peripheral Component Interconnect (PCI) interface, a mini-PCI interface, a Personal Computer Memory Card International Association (PCMCIA) interface, an Industry Standard Architecture (ISA) interface, or a RS-232 interface.

Figure 2:
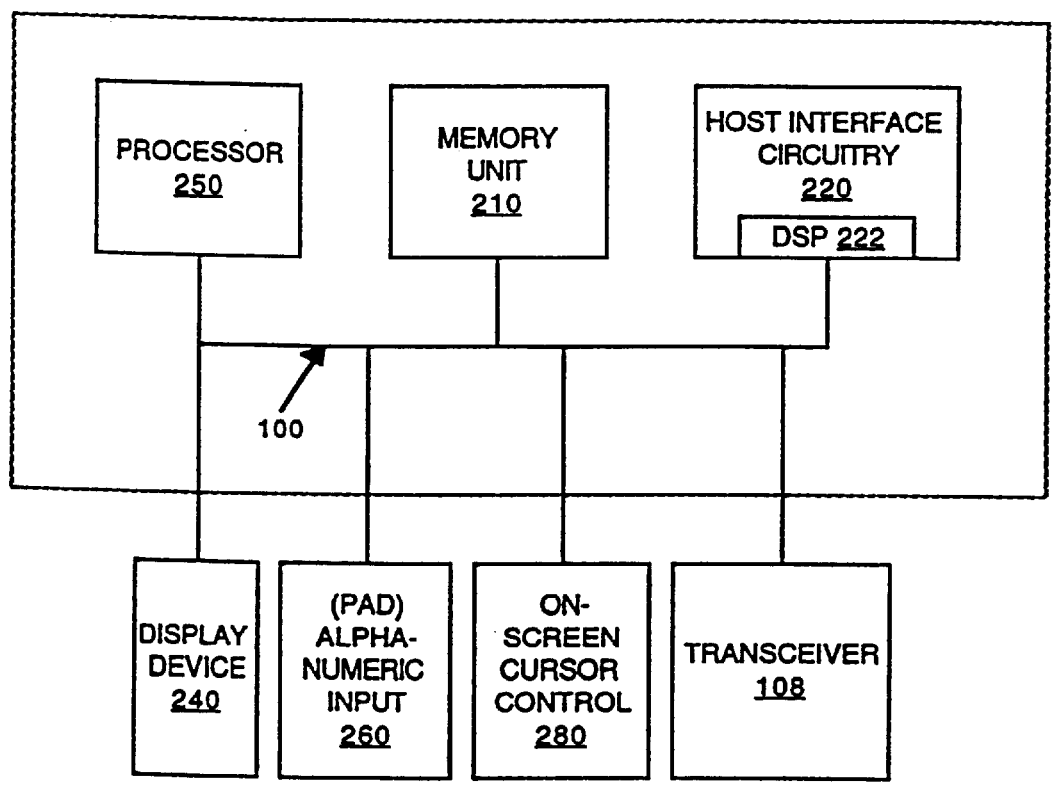
FIG. 2 is a block diagram of an exemplary device coupled to a wireless transceiver in accordance with one embodiment of the present invention.

FIG. 2 is a block diagram of one embodiment of device 190 for hosting a transceiver 108 in accordance with the present invention. In the present embodiment, device 190 is any type of intelligent electronic device (e.g., a desktop or laptop computer system, a portable computer system or personal digital assistant, a cell phone, a printer, a fax system, a document center, etc.). In the Bluetooth embodiment, device 190 is a Bluetooth-enabled device coupled with a Bluetooth transceiver 108 (see FIG. 1, above).

Continuing with reference to FIG. 2, device 190 includes an address/data bus 100 for communicating information, a central processor 250 coupled with the bus 100 for processing information and instructions, and a memory unit 210 (e.g., random access memory and/or read only memory) coupled with the bus 100 for storing information and instructions. It is appreciated that device 190 can include other elements not shown.

In the present embodiment, device 190 also optionally contains a display device 240 coupled to the bus 100 for displaying information to the user. The display device 240 utilized with device 190 may be a liquid crystal display (LCD) device, a cathode ray tube (CRT), a field emission display device (also called a flat panel CRT), or other display device suitable for generating graphic images and alphanumeric characters recognizable to the user.

Device 190 also includes a signal transmitter/receiver device 108, which is coupled to bus 100 for providing a wireless radio (RF) communication link between device 190 and other wireless devices. In the Bluetooth embodiment, transceiver 108 is compliant with the Bluetooth specification ("Specification of the Bluetooth System, Core," version 1.0B, dated Dec. 1, 1999, herein incorporated by reference in its entirety).

In one embodiment, device 190 of FIG. 2 includes host interface circuitry 220 coupled to bus 100. Host interface circuitry 220 includes an optional digital signal processor (DSP) 222 for processing data to be transmitted or data that are received via transceiver 108. Alternatively, processor 250 can perform some or all of the functions performed by DSP 222.

Also included in device 190 is an optional alphanumeric input device 260. Alphanumeric input device 260 can communicate information and command selections to processor 250 via bus 100. In one implementation, alphanumeric input device 260 is a keyboard. In another implementation, alphanumeric input device 260 is a handwriting recognition pad ("digitizer"). In yet another implementation, alphanumeric input device 260 is a touch screen device capable of registering a position where a stylus element (not shown) makes contact.

Device 190 also includes an optional cursor control or directing device (on-screen cursor control 280) coupled to bus 100 for communicating user input information and command selections to processor 250. In one implementation, on-screen cursor control 280 is a trackball, mouse, joystick or special keys on alphanumeric input device 260 capable of signaling movement of a given direction or manner of displacement. It is to be appreciated that the on-screen cursor control 280 also may be directed and/or activated via input from the keyboard using special keys and key sequence commands. In one implementation, on-screen cursor control device 280 is a touch screen device incorporated with display device 240 and capable of registering a position on display device 240 where a stylus element makes contact.

Figure 3A:
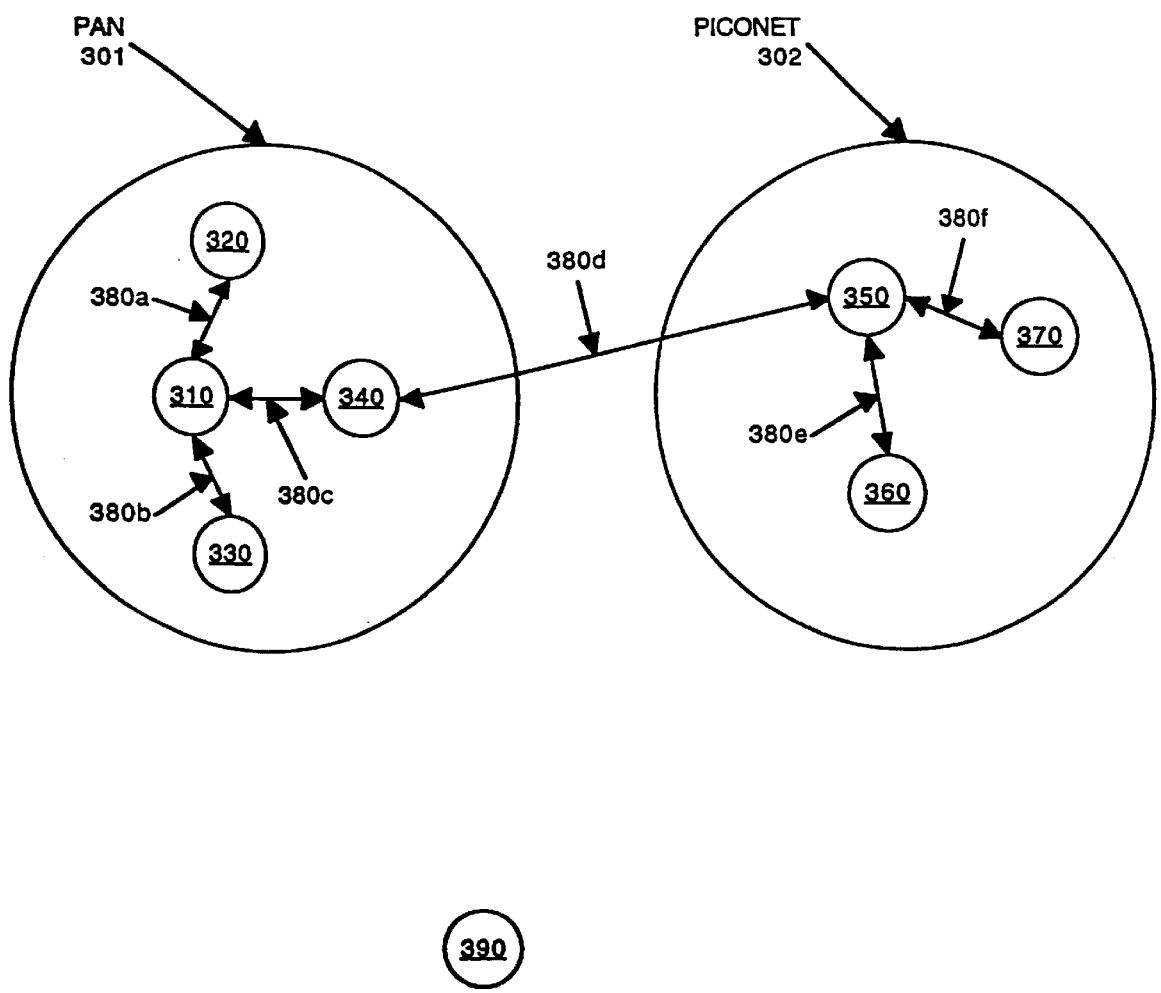
FIGS. 3A and 3B illustrate a network of devices coupled using wireless connections in accordance with one embodiment of the present invention.

FIG. 3A illustrates the topology of a network 200 of devices that can be coupled using wireless connections in accordance with one embodiment of the present invention. Devices 310, 320, 330 and 340 are coupled in personal area network (PAN) 301 using wireless connections 380a–c. Devices 350, 360 and 370 are coupled in piconet 302 using wireless connections 380e–f. PAN 301 and piconet 302 can communicate using wireless connection 380d. Although wireless connection 380d is shown between devices 340 and 350, it is appreciated that each of the devices in PAN 301 and piconet 302 can be in communication with each other.

Devices 310–370 and 390 can be printers, personal digital assistants (PDAs), desktop computer systems, laptop computer systems, cell phones, fax systems, document centers, pagers, keyboards, joysticks and virtually any other device. Typically, PAN 301 comprises mobile devices with which a user can travel with relative ease. Thus, devices 310–340 in PAN 301 typically comprise laptop computer systems, PDAs, cell phones, pagers, and the like. However, PAN 301 can also include devices that are local fixed devices and that are added as members to PAN 301 (e.g., as transient members of PAN 301).

By periodic polling, the member devices of PAN 301 determine by their surrounding netscape that the netscape is in relative stasis, and thus, that the PAN 301 network is then presently non-motile. Correspondingly, the member devices assume a configuration setting conforming to a relatively low degree of mobility. Further, the member devices of PAN 301 determine by their surrounding netscape that the netscape constitutes a particular known location. Correspondingly, the PAN 301 member devices assume a further configuration appropriate for that locale. In the situation just described, the typically mobile PAN 301 member devices achieve configurations substantially approximating the configurations of the typically less mobile member devices. As the individual PAN 301 member devices configure themselves based on their individual characteristics, their aggregate configuration state delineates the PAN 301 network configuration, accordingly.

In the present embodiment, devices 310–370 and 390 are Bluetooth-enabled devices (exemplified by device 190 of FIG. 2). Device 390 represents another Bluetooth-enabled device; one that is not in communication with PAN 301 and/or piconet 302. For example, device 390 may not be in broadcast range.

Figure 3B:
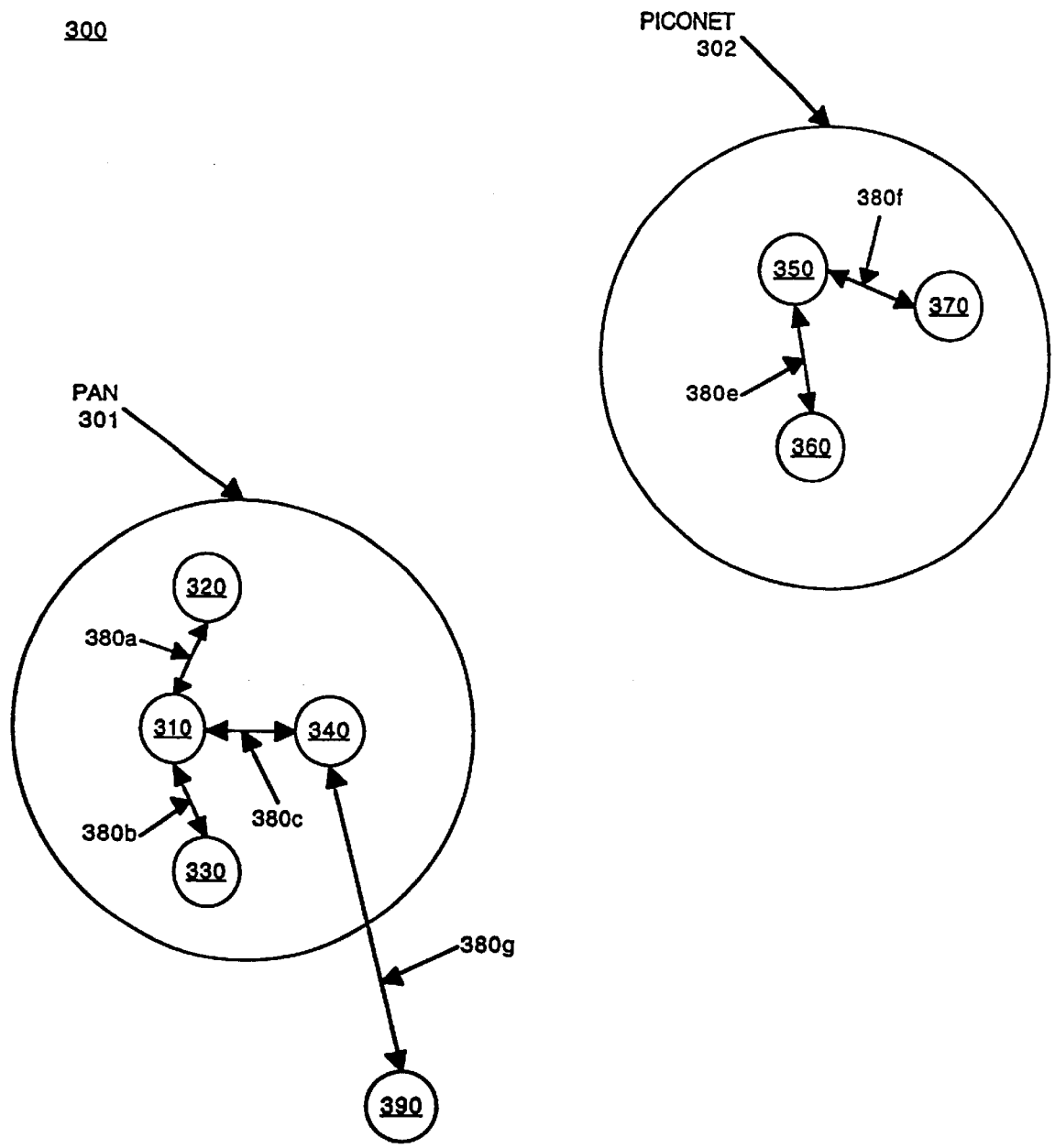

FIG. 3B also illustrates the topology of network 300 in accordance with one embodiment of the present invention; however, in this case, PAN 301 and piconet 302 are not in communication, and PAN 301 is in communication with device 390 via wireless connection 380g. Although device 390 is shown communicatively coupled to device 340, it is appreciated that device 390 can also be communicatively coupled to each device 310–330 in PAN 301.

Relative to FIG. 3A, FIG. 3B illustrates the case in which PAN 301 is mobile, traveling to a different location, out of range of piconet 302 and into range of device 390. It is understood that FIG. 3B also illustrates the case in which PAN 301 is not traveling, or has completed a movement, but where it is in a different particular location, one in which device 390 has moved to within broadcast range of PAN 301.

In the case wherein PAN 301 is in mobile transit, by periodic polling, the member devices determine by their surrounding netscape that the netscape is in flux, and thus, that the PAN 301 network is then presently mobile. This discovery may be made by a single PAN 301 member device, if the other member devices are in a power saving mode. "Discovering" device 390 by such polling (or alternatively, in response to device 390, itself polling), the PAN 301 network learns (or confirms) that it is (still) mobile. Correspondingly, the member devices assume uniform configuration settings conforming to a relatively high degree of mobility. Alternatively, the member devices of PAN 301 determine by their surrounding netscape that the netscape is again static, but, that ambient netscape constitutes a different particular location. Correspondingly, the member devices of PAN 301 assume a further configuration appropriate for that locale. As the individual PAN 301 member devices configure themselves based on their individual characteristics, their aggregate configuration state delineates the PAN 301 network configuration, accordingly.

With reference to FIGS. 3A and 3B, in accordance with the present embodiment of the present invention, a mode of operation for devices 310–340 in PAN 301 is dynamically selected, and the devices in PAN 301 configured accordingly, when device 390 is detected. Devices that are subsequently added to PAN 301, or member devices that are not connected but subsequently become connected, can also be configured accordingly (as they are added or connected).

In general, device 390 is detected by PAN 301 when it sends a wireless signal that is received by a device in PAN 301, or when it responds to a wireless signal sent by a device in PAN 301. In the Bluetooth embodiment, device 390 can be detected by a page or inquiry message sent by device 390 and received by a device in PAN 301 (e.g., by device 340), or a response from device 390 to a page or inquiry message sent by a device in PAN 301 (e.g., by device 340). In this scenario, device 340 is typically the device that has sufficient battery capacity (at least relative to the other devices in PAN 301) to periodically check for other devices in broadcast range. The other devices can be in a lower power mode, in communication with device 340 but not checking for messages from devices outside of PAN 301. Thus, in accordance with the present invention, only one device in the personal area network needs to monitor, for example, changes in degree of mobility, or in location, or in some other characteristic, although any or all devices in PAN 301 can perform such monitoring.

In accordance with the present embodiment of the present invention, the mode of operation implemented in PAN 301 is selected based on information learned by detecting device 390 regarding the relative degree of mobility of PAN 301, its location, and/or some other characteristics. For example, if PAN 301 senses that it is mobile, with a correspondingly high degree of mobility, and/or some other characteristics, then devices 310–340 can be configured according to a mode of operation that is selected based on those characteristics. If the degree of mobility of PAN 301 is high, then devices 310–340 can be configured according to a default mode of operation for a high degree of mobility. The different configurations are defined in advance so that they can be applied dynamically across the personal area network PAN 301, either automatically or manually. Once one of the devices in the personal area network PAN 301 is appropriately configured, the configuration is propagated to the other devices in the network.

In accordance with one embodiment of the present invention, a variety of characteristics can be considered in configuring a mode of operation. In one embodiment, a mode of operation is selected and implemented based on a detectable change, such as movement, or a change in location, of PAN 301. In this embodiment, PAN 301 is moved from one location (FIG. 3A) to a different location (FIG. 3B), or vice versa. In transit, or at the new location, at least one of the devices in PAN 301 (e.g., device 340) detects a device (e.g., a such as device 350 or 390) that is now within range of PAN 301.

Device 340 uses information about device 350 or 390, such as the device's access code or numerical address, to identify the type of location at which PAN 301 is located. For example, device 350 can be associated with a secure environment such as the home or office, and device 390 can be associated with a non-secure environment (e.g., a public location such as an airport). Associated with each type of location, or with each device, is a particular mode of operation (e.g., secure or non-secure, power-efficient or normal power demands, etc.).

In another embodiment, device 340 senses that connection 380d with piconet 302 has been severed. From this information, device 340 infers that it is no longer within range of piconet 302, and that PAN 301 is in motion. In as much as the constituent member devices of PAN 301 in this embodiment may effectively be penultimately designed for mobility, they configure themselves accordingly, i.e., "appropriately," or as programmed in advance, for devices with high degrees of mobility. Such devices may include cell phones, PDA's, laptop computers, portable web browsers, pagers, etc. However, it should be appreciated that in another instance, member devices in PAN 301 could conceivably include some designed to be less mobile, such as desktop computers, fax systems, document centers, etc. Such devices may configure themselves for an elevated, but not necessarily high degree of mobility. It should be noted that static member devices of PAN 301, such as a ceiling-mounted Bluetooth to LAN portal, never move, and rarely if ever poll; their degree of mobility is effectively zero and constant.

In one embodiment of the present invention, device 340 has stored in memory a database associating devices in the database with a particular type of location. Alternatively, location data can be provided (e.g., as a service) by a device (either a member of PAN 301 or not) in proximity with PAN 301. For example, certain devices can be placed in fixed locations, and these types of devices can provide location information to PAN 301 when it moves within range. Static devices may be especially appropriate, but are not exclusive candidates to provide this service. Additional information is provided in conjunction with FIG. 4A, below.

Continuing with reference to FIGS. 3A and 3B, in accordance with the present embodiment of the present invention, when device 350 is detected, device 340 uses the address for device 350 to determine the nature of the location and selects the appropriate mode of operation. Similarly, when device 390 is detected, its address is used by device 340 to identify the type of location and select the appropriate mode of operation. Device 340 changes its configuration to implement the selected mode of operation, and activates the change in configuration in the other devices in PAN 301.

In one embodiment, the process for identifying change in degree of mobility and/or the type of location, and for selecting and implementing the appropriate configuration, occurs automatically. In another embodiment, the user selects the mode of operation to be activated and initiates the change in configuration manually. In one embodiment, the user has the option of activating the configuration on the local device (e.g., device 340), all the devices in PAN 301, or a subset of the devices in PAN 301.

In other embodiments, in lieu of or in addition to the degree of mobility and type of location, the mode of operation can be selected based on factors such as the time of day or the day of the week. A timer mechanism can also be used to select a mode of operation if a specified amount of time has passed; for example, the default mode can be entered if a certain amount of time has passed without confirmation that the personal area network has not been moved. The default mode can also be entered if PAN 301 is moved to a new location, but the type of location cannot be identified (for example, there are no Bluetooth-enabled devices in range at the new location).

Furthermore, the different settings that are used by the various applications executed by the devices in the personal area network can be configured according to the degree of mobility, type of location, or any other characteristics. For example, e-mail options, screen savers, connectivity options, desktop settings, and home pages (for Internet connections) can be set depending on whether the personal area network is located at home, at work, in transit, or elsewhere. Also, the level of power usage can be adjusted for specific devices in the personal network depending on the type of location or other factors; for example, certain devices may be placed in a low power or standby mode. In accordance with the present invention, the various applications which can be configured according to these characteristics also include, but are not limited to, security settings, polling, control, interconnection, communicative response, power level definition, and power state permissiveness of said device.

If the devices in PAN 301 are already configured for the selected mode of operation, a change in configuration is not made. In one embodiment, a flag is set to indicate which mode of operation is active. If the flag is set indicating that the selected mode of operation is currently active, then the current configuration is not changed.

Figure 4A:
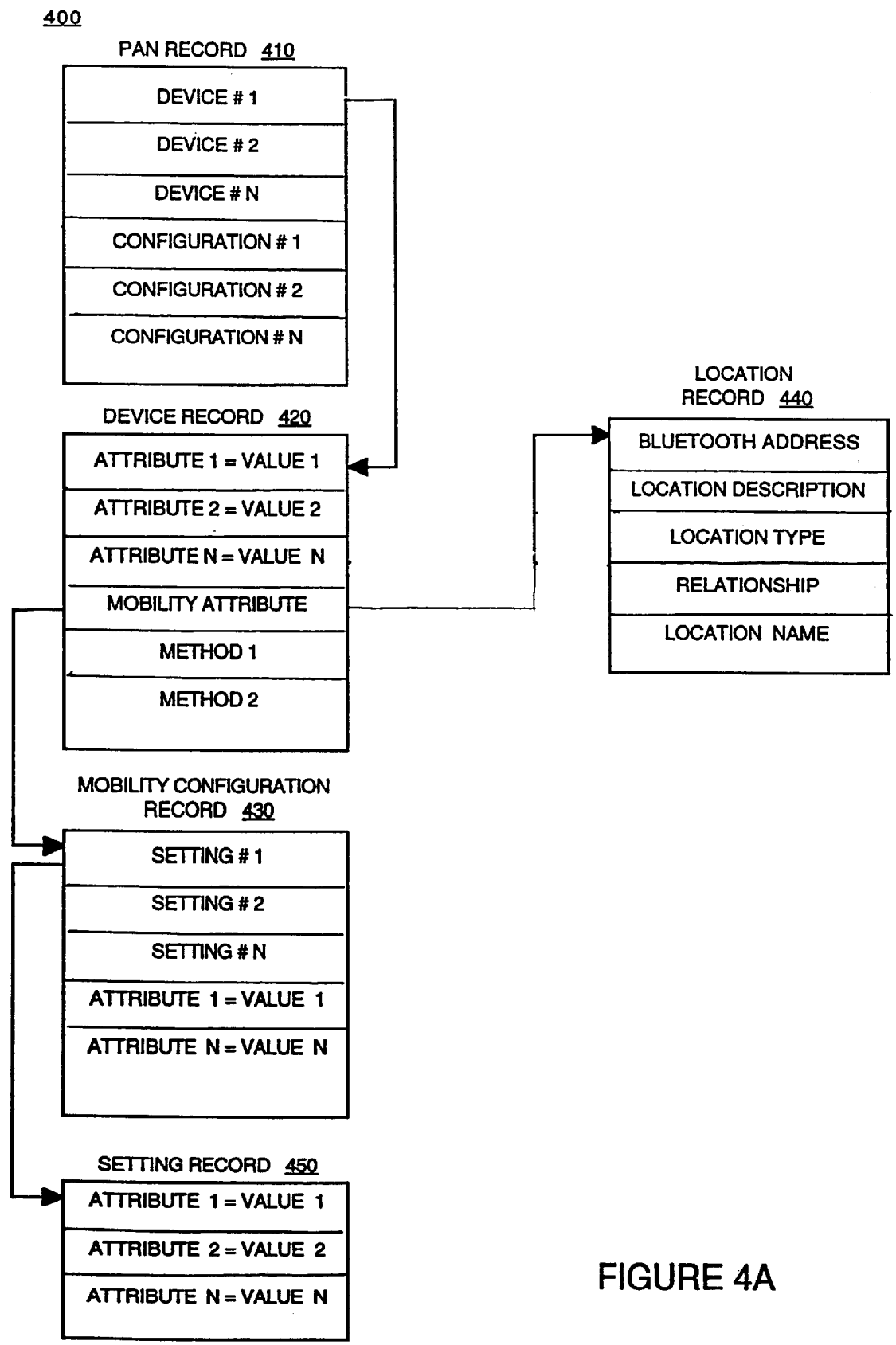
FIG. 4A illustrates one embodiment of a data structure for caching device information in accordance with the present invention.

FIG. 4A illustrates one embodiment of a data structure 400 for caching device information in accordance with the present invention. In this embodiment, data structure 400 includes a device record 420, a mobility configuration record 430, a location record 440, and a setting record 450. Data structure 400 is a database in cache memory (e.g., memory unit 210 of FIG. 2) of at least one of the devices (e.g., device 340) in the personal area network (e.g., PAN 301).

It is appreciated that, in another embodiment, data structure 400 can be cached in each of the devices in PAN 301. In this embodiment, if data structure 400 is modified on one of the devices in PAN 301, either the change or the modified data structure are communicated to the other devices in PAN 301. A change in the data structure 400 can also be exchanged between devices by synchronizing the devices according to a synchronization process (e.g., HotSync). It is appreciated that other mechanisms can be used to share data structure 400 among the devices in PAN 301.

In the present embodiment, data structure 400 provides a database defining the devices in PAN 301, certain other devices, different modes of operations, attributes and settings associated with those modes of operations, and information that allows a mode of operation to be selected based on characteristics such as degree of mobility, location, or any other characteristic, and/or factors, such as day of the week, time of day, etc.

For example, as PAN 301 becomes mobile, at least one of the member devices linked via wireless communicative connection 380d to piconet 302, such as device 340 (FIGS. 3A and 3B), senses that, at the limit of the communicative medium's range (approximately 10 meters/30 feet for Bluetooth radio), or through some other limitation, connection 380d is severed, or a device known to be "outside," or known not to be "inside," PAN 301 is detected. In this example, the device discovers that it, with PAN 301 is mobile. Or for instance, as PAN 301 is moved to different locations, or if a device enters the range of PAN 301, at least one of the devices in PAN 301 attempts to determine its location using the address of the device that came within range in conjunction with the information in data structure 400. The information in data structure 400 can also be used to select the appropriate mode of operation associated with the device degree of mobility and/or location, and to implement the selected mode of operation according to the settings and attributes also cached in data structure 400.

The information in data structure 400 can be pre-loaded, or the information can be built up over time. For example, data structure 400 can be initialized with known addresses for Bluetooth devices, such as devices that provide LAN or other network access points, and these entries can be subsequently deleted or edited, and new entries added. Data structure 400 can be modified manually by a user, and/or data structure 400 can be updated automatically. For example, if a device enters into the vicinity of PAN 301, a user can choose to add information about this device to data structure 400, or information about the device can be added automatically. Likewise, data structure 400 can be modified or updated according to a synchronization process such as HotSync.

Continuing with reference to FIG. 4A, PAN record 410 also includes a list of the different types of configurations (modes of operation) that can be used for PAN 301. The settings associated with each configuration are defined in advance, so that they can automatically be implemented when appropriate. The Generic Access Profile (GAP) of the Bluetooth specification ("Specification of the Bluetooth System, Core," version 1.0B, dated Dec. 1, 1999, herein incorporated by reference) defines three modes of operation for Bluetooth-enabled devices: discoverable, connectable, and paired. Other modes of operation can include security settings, power level, and settings for applications.

Associated with each device in PAN record 410 is a device record 420. Device record 420 includes the values for different attributes associated with each device in PAN record 410. The attributes can be set according to the values and settings associated with a particular configuration (mode of operation) as defined by configuration record 430. These attributes can also include, for example, the degree of mobility attributes for these devices. The device record may also include programmed routines for appropriately configuring each device to correspond with its degree of mobility. Accordingly, if the device degree of mobility changes, the value of the corresponding degree of mobility attribute is dynamically adjusted. In another example, these attributes may include a device location. Accordingly, if the device changes location, the value of the attribute is dynamically updated. It should be appreciated that in accordance with the present invention, any conceivable dynamically alterable characteristic may provide a dynamically adjustable attribute setting.

For each configuration in PAN record 410, a set of defined settings and values are included in mobility configuration record 430. Mobility configuration record 430 can include user-defined values, default values, and, for devices incorporating Bluetooth technology, values set according to the modes of operation established by the Bluetooth specification referenced above (e.g., connectable, discoverable, paired). Settings and attributes for different configurations can be defined for different degrees of mobility (e.g., highly or always mobile, somewhat or often mobile, seldom mobile or "moveable," and static or fixed). Settings and attributes for different configurations can also be defined for different types of locations or environments (e.g., home, office, mobile or in-transit, private, public, secure, non-secure, etc.). Setting record 450 can include values for different attributes associated with each of the settings in mobility configuration record 430.

Table 1 below describes modes for various settings for different types of locations in accordance with one embodiment of the present invention, for Bluetooth-enabled devices in particular. "Secure Location" refers to locations where the devices in PAN 301 will not be accessed by an unknown device. "Non-Secure Location" refers to public places where higher security is needed. Devices in PAN 301 need to be able to communicate with each other, but not respond to other devices in the vicinity. "Semi-Secure Location" refers to locations where data and information can be shared only with specific devices outside of PAN 301.

TABLE 1

| BLUETOOTH SETTING | NON-SECURE LOCATION | SECURE LOCATION | SEMI-SECURE LOCATION |
|---|---|---|---|
| Discoverability Mode | Non-discoverable | Discoverable | Limited Discoverable |
| Connectability Mode | Non-connectable | Connectable | Limited Connectable |
| Pairing Mode | Non-pairable (pre-paired) | Pairable | Non-pairable |
| Security | Mode 3 | Mode 1 | Mode 2 |

Table 2 shows, for one embodiment, what operations a Bluetooth-enabled device will respond to or allow at various types of locations when the operation is made by an "unknown" device (e.g., a device not described by data structure 400).

TABLE 2

| BLUETOOTH OPERATION | PAIRED DEVICE IN NON-SECURE LOCATION | DEVICE IN SECURE LOCATION | DEVICE IN SEMI-SECURE LOCATION |
|---|---|---|---|
| General Inquiry | No | Yes | No |
| Limited Inquiry | No | Yes | Yes |
| Name Discovery | No | Yes | Yes |
| Device Discovery | No | Yes | Yes |
| Bonding (Pairing) | No | Yes | No |
| Paging | No | Yes | Yes |

Table 3 below describes modes for various settings for different degrees of mobility in accordance with one embodiment of the present invention, for Bluetooth-enabled devices in particular. "Highly mobile" refers to degrees of mobility of devices designed for regular, even constant transport over vast distances, where they will often be in public places where higher security and power efficiency is needed. "Less mobile" refers to degrees of mobility of devices which can be moved, or which are sometimes, but not regularly or often mobile, wherein data and information can be shared only with specific devices outside of PAN 301. "Static" refers to fixed devices, with constant, zero degrees of mobility. Transit security and power efficiency are not issues for these devices because they remain in a fixed location, and may hence address known devices and/or a known, fixed threat load with a preprogrammed security regime, and they may be powered via hard wiring to installed electrical supplies.

TABLE 3

| BLUETOOTH SETTING | HIGHLY MOBILE | LESS MOBILE | STATIC |
|---|---|---|---|
| Discoverability Mode | Non-discoverable | Limited Discoverable | Discoverable |
| Connectability Mode | Non-connectable | Limited Connectable | Connectable |
| Pairing Mode | Non-pairable (pre-paired) | Non-pairable | Pairable |
| Security | Mode 3 | Mode 2 | Mode 1 |

Table 4 shows, for one embodiment, what operations a Bluetooth-enabled device will respond to or allow at varying degrees of mobility when the operation is made by an "unknown" device (e.g., a device not described by data structure 400).

TABLE 4

| BLUETOOTH OPERATION | PAIRED DEV.'S HIGH DEGREE OF MOBILITY | DEVICE WITH LOWER DEGREE OF MOBILITY | STATIC DEVICE (ZERO DEGREE OF MOBILITY) |
|---|---|---|---|
| General Inquiry | No | No | Yes |
| Limited Inquiry | No | Yes | Yes |
| Name Discovery | No | Yes | Yes |
| Device Discovery | No | Yes | Yes |
| Bonding (Pairing) | No | No | Yes |
| Paging | No | Yes | Yes |

Table 5 shows, for one embodiment, what power efficiency improvements, or power economizing steps may be implemented according to device degrees of mobility in Bluetooth enabled devices.

TABLE 5

| POWER MODE (BLUETOOTH DUTY CYCLE) | MASTER WITH HIGH DEGREE OF MOBILITY | SLAVES WITH HIGH DEGREES OF MOBILITY | STATIC DEVICE (ZERO DEGREE OF MOBILITY) |
|---|---|---|---|
| Standby | Yes | Yes | Yes |
| Page | Yes | No | Yes |
| Inquiry | Yes | No | Yes |
| Sniff | Yes | Yes | No |
| Hold | No | Yes | No |
| Park | No | Yes | No |

Continuing with reference to FIG. 4A, location record 440 is a record providing location information for a particular device significant to PAN 301. A user-friendly name describing the location, the type of location, and the location description can be included. Whether a loss or absence of contact with the particular device denotes mobility can also be included. The relationship between the device and PAN 301 can also be included (e.g., member or non-member device).

Figure 4B:
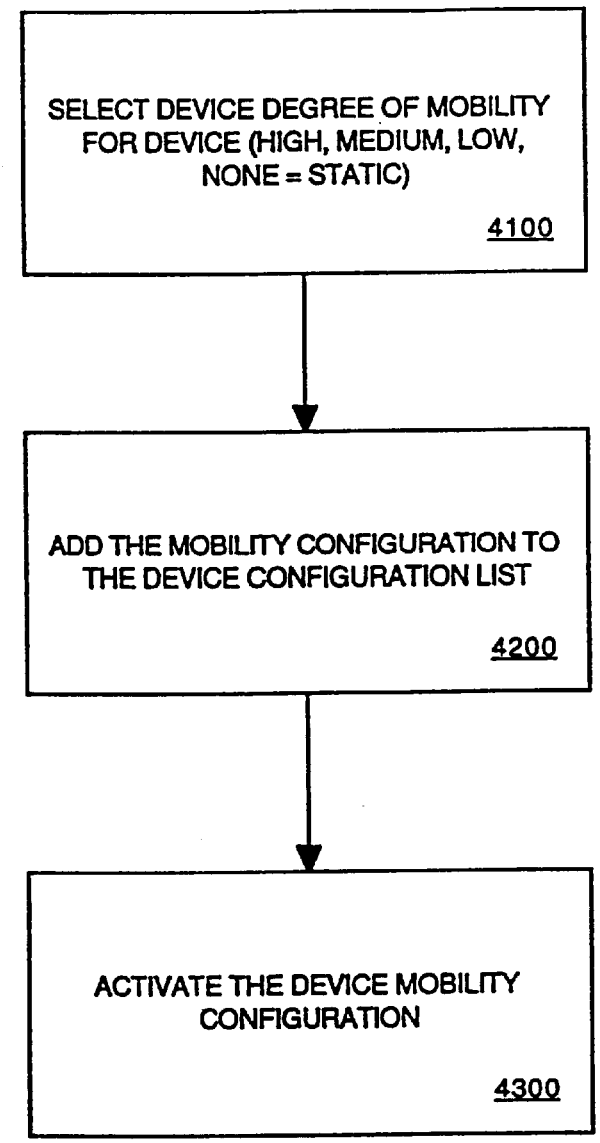
FIG. 4B is a flowchart of the steps in a process for implementing a mobility setting and activating a degree of mobility based configuration in accordance with one embodiment of the present invention.

FIG. 4B is a flowchart of the steps in a process 4000 of one embodiment of the present invention for implementing settings based on degrees of mobility and for activating corresponding degree of mobility based configurations.

In step 4100, a degree of mobility is selected for a device. In one implementation, the selection is made by a user. In another implementation, the selection is made automatically. In yet another implementation, both user selected device degrees of mobility and automatic selections of this attribute are accommodated.

In step 4200, the mobility configuration is added to the device mobility configuration list, 430 (FIG. 4A). In step 4300, the device mobility configuration is activated accordingly (see list 450, FIG. 4A, and Process 600, FIG. 6).

Figure 5:
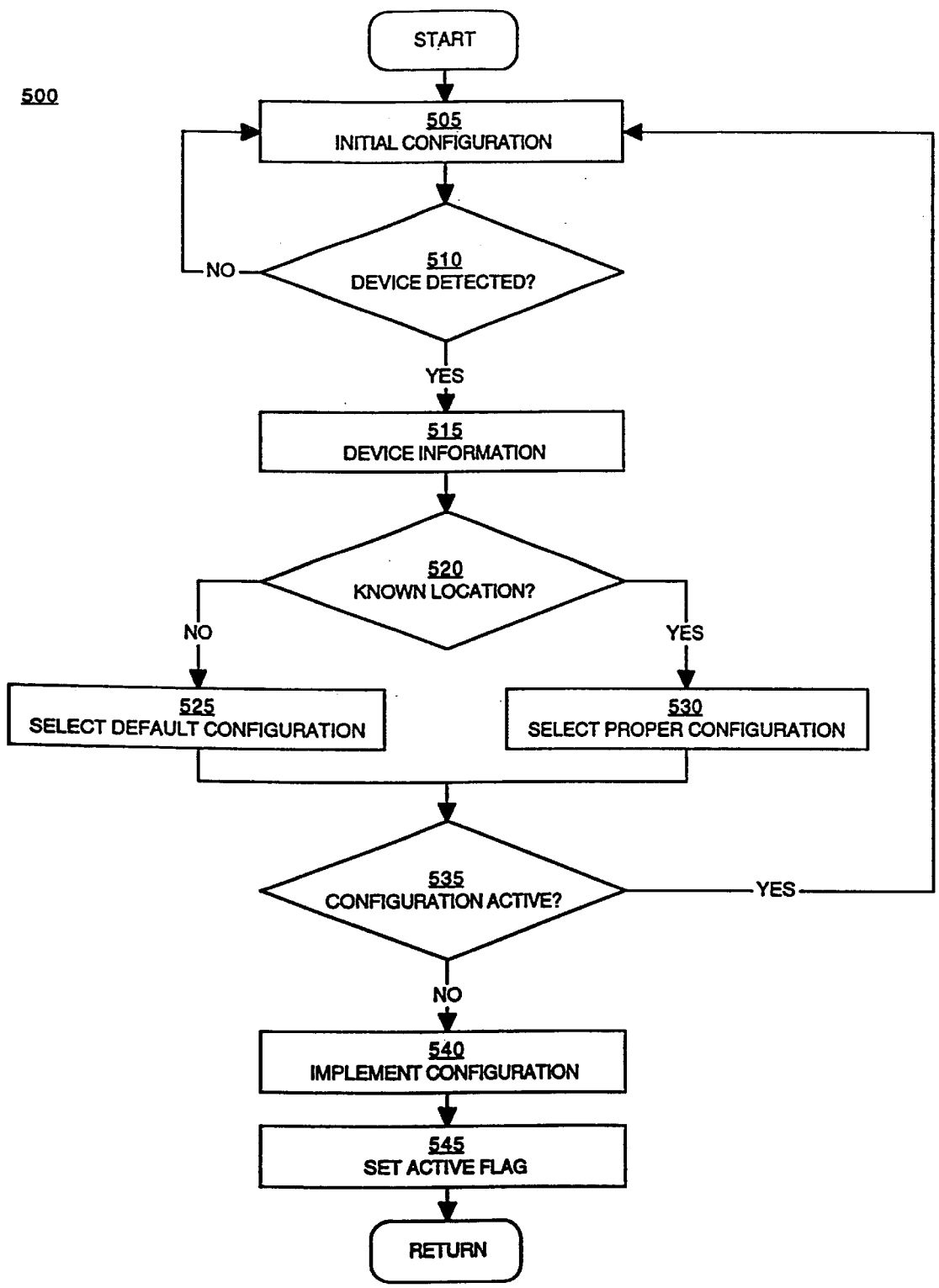
FIG. 5 is a flowchart of the steps in a process for selecting a mode of operation for devices in a personal area network in accordance with one embodiment of the present invention.

FIG. 5 is a flowchart of the steps in a process 500 for selecting a mode of operation for devices in a personal area network in accordance with one embodiment of the present invention. In this embodiment, process 500 is implemented as computer-readable instructions stored in memory (e.g., memory unit 210 of FIG. 2) and executed by a processor (e.g., processor 250 of FIG. 2) of a device in a personal area network (e.g., device 340 and PAN 301 of FIGS. 3A and 3B).

In step 505 of FIG. 5, with reference also to FIGS. 3A and 3B, the member devices in PAN 301 are in an initial configuration for a selected mode of operation.

In step 510 of FIG. 5, again with reference to FIGS. 3A and 3B, a device in proximity to PAN 301 (e.g., device 350 or 390) may be detected. For example, PAN 301 may be moving, or have moved to another location within proximity of device 350 or 390, or one of these devices may have moved to within proximity of PAN 301 (specifically, device 340). As described above, device 340 is operating in a mode where it can monitor for other devices that move within its range, and/or for loss of communications with other devices. In the Bluetooth embodiment, device 340 may be sending page messages or inquiry messages, and can detect a proximate device by a response to one of these messages. Also, device 340 may be in the connectable or discoverable mode, and as such will detect an inquiry or a page received from a proximate device.

In step 515 of FIG. 5, if a proximate device (e.g., device 350 or 390 of FIGS. 3A and 3B) is detected, information from the device can be used to select the appropriate mode of operation based on the information in data structure 400.

In step 520 of FIG. 5, if device 350 or 390 is a "known" device (that is, it can be found in data structure 400), then process 500 proceeds to step 530; otherwise, process 500 proceeds to step 525. In step 525, for unknown devices (devices not found in data structure 400), a default configuration is selected.

In step 530, for known devices, the appropriate configuration (mode of operation) associated with device 350 or 390 is selected using the information in data structure 400. In one embodiment, for example, the address of device 350 or 390 can be used as an index to locate in data structure 400 (FIG. 4) the degree of mobility and/or the nature of the location associated with device 350 or 390. Associated with this degree of mobility and/or the type of location is a mode of operation and associated configuration information (settings and attributes) needed to configure the devices in PAN 301 according to that mode of operation.

In step 535, if device 340 is currently configured according to the mode of operation that is selected in step 525, then a change in configuration is not required, and process 500 returns to step 505. Otherwise, device 340 is configured according to the selected mode of operation (step 540) using the settings and attributes defined by data structure 400. Device 340 then implements the change in configuration in the other devices in PAN 301; refer to FIG. 6.

In step 545, in one embodiment, a flag associated with the selected mode of operation is set (e.g., a bit is assigned a binary value of 0 or 1) to indicate the active configuration. The flag is used in step 535 (above) to identify whether device 340 (as well as the other devices in PAN 301) is already configured according to the selected mode of operation.

Figure 6:
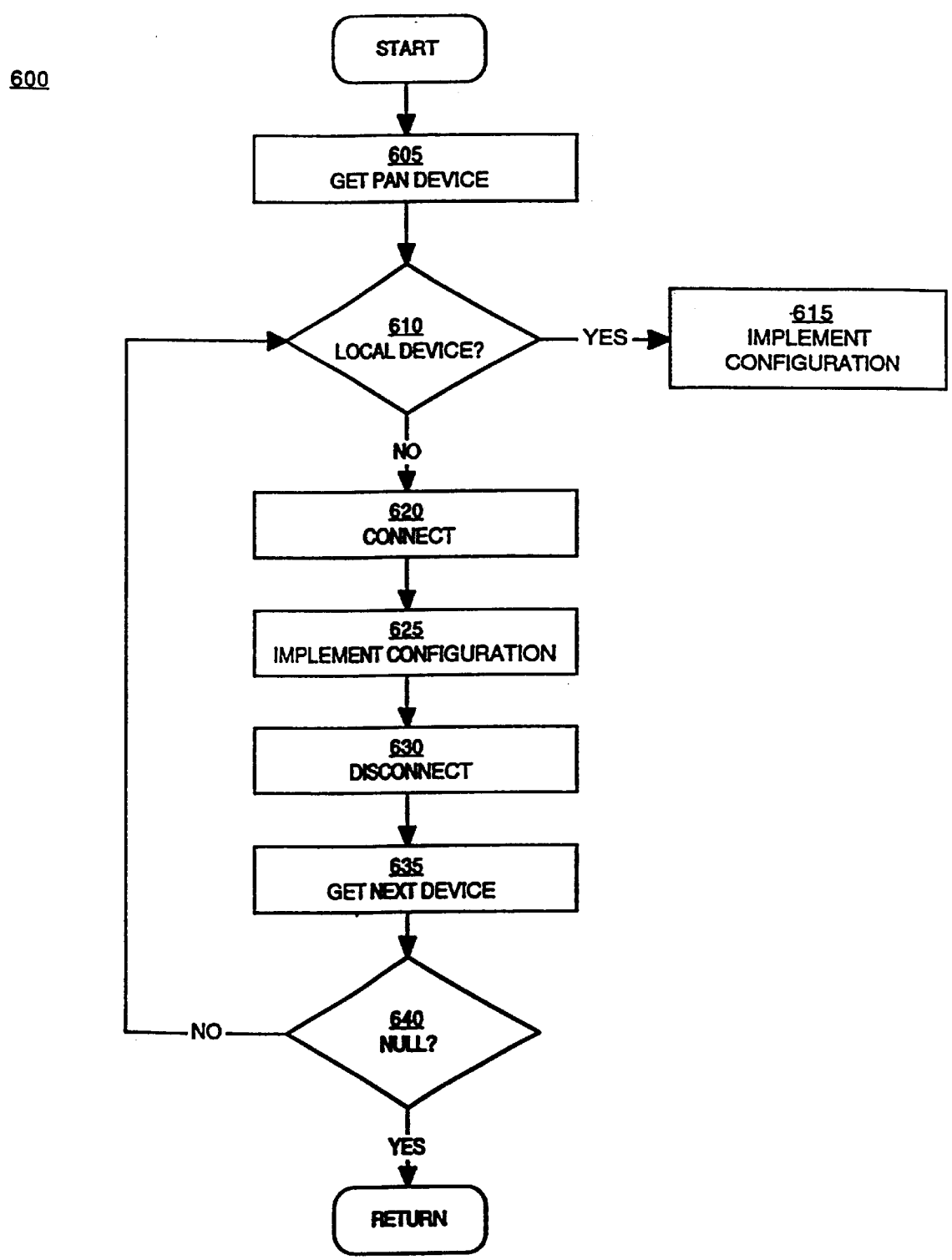
FIG. 6 is a flowchart of the steps in a process for configuring devices in a personal area network in accordance with one embodiment of the present invention.

FIG. 6 is a flowchart of the steps in a process 600 for configuring devices (e.g., devices 310–330 of FIGS. 3A and 3B) in a personal area network (e.g., PAN 301 of FIGS. 3A and 3B) in accordance with one embodiment of the present invention. In this embodiment, process 600 is implemented as computer-readable instructions stored in memory (e.g., memory unit 210 of FIG. 2) and executed by a processor (e.g., process 250 of FIG. 2) of a device in a personal area network (e.g., device 340 and PAN 301 of FIGS. 3A and 3B). In one embodiment, an agent application running on devices 310–330 is used to implement aspects of process 600.

In step 605 of FIG. 6, with reference also to FIGS. 3A, 3B and 4, one of the devices (e.g., device 310) listed in PAN record 410 of data structure 400 is selected.

In step 610 of FIG. 6, if the device is the local device (e.g., device 340) and the device is not already configured according to the selected mode of operation, then in step 615 the configuration is changed as described above in conjunction with FIG. 5. Otherwise, process 600 proceeds to step 620.

In step 620, a wireless connection is made between device 340 and device 310. In the Bluetooth embodiment, the connection is made per the Bluetooth specification referenced above.

In step 625, device 310 is configured according to the selected mode of operation. In one embodiment, the settings and attributes for the new configuration are provided by device 340 from data structure 400. In another embodiment, data structure 400 resides on each of the devices in PAN 301, and accordingly device 340 provides the identity of the selected mode of operation.

In step 630, device 340 disconnects from device 310. In step 635, device 340 selects the next device listed in PAN record 410. Information in data structure 400 is used to identify whether a device in PAN record 410 is a member of PAN 301 or not.

In step 640, if there are no more devices in PAN 301 that need to be configured, then process 600 is complete. Otherwise, steps 610 through 635 are repeated until all devices in PAN 301 are appropriately configured. Devices that are subsequently added to PAN 301, or member devices that are not connected but subsequently become connected, can also be appropriately configured as they are added or connected.

In summary, the present invention provides a method and system thereof that can efficiently accommodate member devices having varied respective characteristics. The present invention also provides a method and system which achieves the above accomplishment and which can accommodate changes in the varied characteristics of member devices. Further, the present invention provides a method and system which achieves the above accomplishment and which is applicable without revamping of existing network infrastructures.

Thus, one embodiment of the present invention has been described, a method and system thereof for dynamically configuring a device, adapted to be communicatively coupled in a wireless personal area network, with an attribute corresponding to a characteristic of the device and network. The method involves receiving an attribute setting corresponding to characteristics of the device and implementing a corresponding configuration state. In one embodiment, the configuration state activates a corresponding device configuration. In one embodiment, the attribute setting constitutes a discretely variable value conforming to the degree of mobility of the device. In one embodiment, an attribute setting constitutes a discretely variable value conforming to the location of the device. In one embodiment, two attribute settings constitute discretely variable values conforming one to the degree of mobility of the device, and the other to its location. In one embodiment, the device and network incorporate communicative capability compliant with the Bluetooth specification.

An embodiment of the present invention, a method and system thereof for Personal Area Network (PAN) degrees of mobility-based configuration, is thus described. While the present invention has been described in particular embodiments, it should be appreciated that the present invention should not be construed as limited by such embodiments, but rather construed according to the following claims.

What is claimed is:

1. A method for dynamically configuring a device, adapted to be communicatively coupled in a wireless personal area network, with an attribute corresponding to a characteristic of said device, said method comprising:
   a) receiving an attribute setting by periodic polling, said attribute setting corresponding to a characteristic of said device relating to a condition of mobility of said network, wherein said device incorporates communicative capability compliant with the Bluetooth specification; and
   b) automatically implementing a configuration state, wherein said configuration state corresponds to said attribute setting.

2. The method as recited in claim 1 wherein said method further comprises activating a configuration of said device corresponding to said configuration state.

3. The method as recited in claim 1 wherein said attribute setting comprises a discretely variable value conforming to the degree of mobility of said device.

4. The method as recited in claim 1 wherein said attribute setting comprises a discretely variable value corresponding to the nature of the location of said device.

5. The method as recited in claim 3 wherein said discretely variable value ranges from a discrete high value to a discrete low value, corresponding to a range of relative degrees of mobility of said device.

6. The method as recited in claim 5 wherein said discretely variable value is changeable, dynamically corresponding to, selectively, increasing and decreasing degrees of mobility.

7. The method as recited in claim 1 wherein said configuration state, selectively, enables and restricts modes of operation of said device.

8. The method as recited in claim 7 wherein said modes of operation define settings used by an application executing on said device.

9. The method as recited in claim 8 wherein said applications, selectively, include security settings, polling, control, interconnection, communicative response, power level definition, and power state permissiveness of said device.

10. A system, adapted to be communicatively coupled in a wireless personal area network, said system comprising:
    a bus;
    a transceiver coupled to said bus and operable to send and receive wireless signals;
    a memory unit coupled to said bus; and
    a processor coupled to said bus, said processor for implementing a method for
    a) receiving a attribute setting by periodic polling, said attribute setting corresponding to a characteristic of said system relating to a condition of mobility of said network, wherein said device incorporates communicative capability compliant with the Bluetooth specification; and
    b) automatically implementing a configuration state, wherein said configuration state corresponds to said attribute setting.

11. The system of claim 10 wherein said method further comprises activating a configuration of said system corresponding to said configuration state.

12. The system of claim 10 wherein said attribute setting comprises a discretely variable value conforming to the degree of mobility of said system.

13. The system of claim 10 wherein said attribute setting comprises a discretely variable value corresponding to the nature of the location of said system.

14. The system of claim 12 wherein said discretely variable value ranges from a discrete high value to a discrete low value, corresponding to a range of relative degrees of mobility of said system.

15. The system of claim 14 wherein said discretely variable value is changeable, dynamically corresponding to, selectively, increasing and decreasing degrees of mobility.

16. The system of claim 10 wherein said configuration state, selectively, enables and restricts modes of operation of said system.

17. The system of claim 16 wherein said modes of operation define settings used by an application executing on said system.

18. The system of claim 17 wherein said applications, selectively, include security settings, polling, control, interconnection, communicative response, power level definition, and power state permissiveness of said system.

19. In a wireless personal area network comprising a first wireless transceiver member device communicatively coupled to at least one other wireless transceiver member device, a method for dynamically configuring said network, with an attribute corresponding to a characteristic of said network, said method comprising the steps of:
   a) responsive to periodic polling, communicating among said member devices an attribute setting; said attribute setting corresponding to a characteristic of at least one of said member devices comprising said network and relating to a condition of mobility of said network, wherein said member devices incorporate communicative capability compliant with the Bluetooth specification; and
   b) automatically implementing a configuration state, wherein said configuration state corresponds to said attribute setting.

20. The method as recited in claim 19 wherein said method further comprises activating a configuration of said network corresponding to said configuration state.

21. The method as recited in claim 19 wherein said attribute setting comprises a discretely variable value conforming to the degree of mobility of said network.

22. The method as recited in claim 19 wherein said attribute setting comprises a discretely variable value corresponding to the nature of the location of said network.

23. The method as recited in claim 21 wherein said discretely variable value ranges from a discrete high value to a discrete low value, corresponding to a range of relative degrees of mobility of said network.

24. The method as recited in claim 23 wherein said discretely variable value is changeable, dynamically corresponding to, selectively, increasing and decreasing degrees of mobility.

25. The method as recited in claim 19 wherein said configuration state, selectively, enables and restricts modes of operation of said network.

26. The method as recited in claim 25 wherein said modes of operation define settings used by an application executing on said network.

27. The method as recited in claim 26 wherein said applications, selectively, include security settings, polling, control, interconnection, and communicative response.

* * * * *